US012692336B2

(12) United States Patent
Hasimoto

(10) Patent No.: US 12,692,336 B2
(45) **Date of Patent: *Jul. 28, 2026**

(54) RUBBER COMPOSITION AND PNEUMATIC TIRE

(71) Applicant: Toyo Tire Corporation, Itami (JP)

(72) Inventor: Akari Hasimoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 587 days.

This patent is subject to a terminal disclaimer.

(21) Appl. No.: 17/982,659

(22) Filed: Nov. 8, 2022

(65) Prior Publication Data

US 2023/0192932 A1 Jun. 22, 2023

(30) Foreign Application Priority Data

Dec. 16, 2021 (JP) ................................ 2021-204141

(51) Int. Cl.
*C08F 253/00* (2006.01)
*B60C 1/00* (2006.01)

(52) U.S. Cl.
CPC .............. *C08F 253/00* (2013.01); *B60C 1/00* (2013.01)

(58) Field of Classification Search
CPC .... B60C 1/00; C08L 7/00; C08K 5/13; C08K 5/09
See application file for complete search history.

(56) References Cited

U.S. PATENT DOCUMENTS

| | | | | |
|---|---|---|---|---|
| 2001/0043957 | A1* | 11/2001 | Mann | A61K 36/38 514/567 |
| 2017/0058110 | A1* | 3/2017 | Nishimura | B60C 1/00 |
| 2020/0391550 | A1 | 12/2020 | Sawaki et al. | |
| 2021/0087356 | A1* | 3/2021 | Thuilliez | C08K 3/04 |
| 2021/0087366 | A1 | 3/2021 | Thuilliez et al. | |
| 2021/0332222 | A1 | 10/2021 | Zhu et al. | |
| 2023/0192932 | A1 | 6/2023 | Hasimoto | |
| 2024/0050924 | A1* | 2/2024 | Kirchhoff | C08G 73/0206 |
| 2024/0218166 | A1 | 7/2024 | Hashimoto | |

FOREIGN PATENT DOCUMENTS

| | | | | |
|---|---|---|---|---|
| CA | 3181270 | A1 * | 12/2021 | B60C 1/00 |
| JP | 58002337 | A * | 1/1983 | |
| JP | 2010-59327 | A | 3/2010 | |
| JP | 2011-063718 | A | 3/2011 | |
| JP | 2012-229357 | A | 11/2012 | |
| JP | 2019-210488 | A | 12/2019 | |
| JP | 2021-507038 | A | 2/2021 | |
| JP | 2021-195491 | A | 12/2021 | |
| JP | 2023-089553 | A | 6/2023 | |
| JP | 7511393 | B2 | 7/2024 | |
| WO | WO-2010000294 | A1 * | 1/2010 | B60C 1/0016 |
| WO | WO-2019122586 | A1 * | 6/2019 | B60C 1/00 |

OTHER PUBLICATIONS

Non-Final Office Action dated May 20, 2025, issued in U.S. Appl. No. 18/529,536 (19 pages).
Extended European Search Report dated Nov. 11, 2025, issued in application No. 25184115.1 which is counterpart to related U.S. Appl. No. 19/247,463 (9 pages)
Extended European Search Report dated Nov. 11, 2025, issued in application No. 25184113.6 which is counterpart to related U.S. Appl. No. 19/248,697 (9 pages).
Extended European Search Report dated Nov. 7, 2025, issued in application No. 25184110.2 which is counterpart to related U.S. Appl. No. 19/241,677 (9 pages).
Extended European Search Report dated Nov. 11, 2025, issued in application No. 25184103.7 which is counterpart to related U.S. Appl. No. 19/241,699 (9 pages).
Office Action dated Sep. 10, 2025, issued in counterpart JP application No. 2021-204141, with English translation. (8 pages).

* cited by examiner

*Primary Examiner* — Mark S Kaucher
(74) *Attorney, Agent, or Firm* — WHDA, LLP

(57) ABSTRACT

A rubber composition comprising, per 100 parts by mass of a total amount of a rubber component, 0.1 to 10 parts by mass of a compound represented by the following general formula (1):

[Formula 1]

(1)

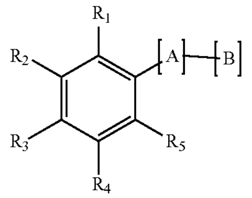

wherein at least one of $R_1$ to $R_5$ is an —OH group or an —$OCH_3$ group and others are each an —H group or a hydrocarbon group having 1 to 20 carbon atoms, A is an unsaturated bond or an alkylene group having 1 to 20 carbon atoms and optionally having an —H group, a —$CH_3$ group, an —$NH_2$ group, an —O— group, or an —OH group, n is an integer of 0 to 10, and B is a —COOH group, an —OH group, or an =O group and optionally forms a ring structure with adjacent $R_1$ or $R_5$.

5 Claims, No Drawings

RUBBER COMPOSITION AND PNEUMATIC TIRE

BACKGROUND OF THE INVENTION

Field of the Invention

The present invention relates to a rubber composition and a pneumatic tire including a rubber part containing a vulcanized rubber of the rubber composition.

Description of the Related Art

A rubber product including a rubber part, such as a pneumatic tire or a rubber vibration insulator, may generally deteriorate in durability during long-term use as a result of the occurrence of cracking caused by deterioration by oxygen or ozone in the air. Therefore, various antiaging agents are added to a rubber composition used as a raw material to prevent oxidation deterioration or ozone deterioration of the rubber part.

Patent Document 1 mentioned below discloses a rubber composition obtained by blending 0.5 parts by weight of an amine-based antiaging agent and 0.5 to 8 parts by weight of a polyphenol-based compound with 100 parts by weight of a rubber component containing a diene-based rubber.

PRIOR ART DOCUMENT

Patent Document

Patent Document 1: JP-A-2010-59327

SUMMARY OF THE INVENTION

However, as a result of intensive studies, the present inventor has found that the rubber composition disclosed in the above patent document has room for improvement to further improve the heat aging resistance of a resultant vulcanized rubber.

The present invention has been accomplished by considering the circumstances as described above, and an object thereof is to provide a rubber composition excellent in heat aging resistance and a pneumatic tire including a rubber part containing a vulcanized rubber of the rubber composition.

The above object can be achieved by the present invention as described below. Specifically, the present invention relates to a rubber composition containing, per 100 parts by mass of a total amount of a rubber component, 0.1 to 10 parts by mass of a compound represented by the following general formula (1):

[Formula 1]

(1)

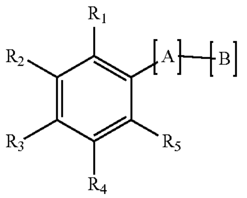

wherein at least one of $R_1$ to $R_5$ is an —OH group or an —$OCH_3$ group and others are each an —H group or a hydrocarbon group having 1 to 20 carbon atoms, A is an unsaturated bond or an alkylene group having 1 to 20 carbon atoms and optionally having an —H group, a —$CH_3$ group, an —$NH_2$ group, an —O— group, or an —OH group, n is an integer of 0 to 10, and B is a —COOH group, an —OH group, or an =O group and optionally forms a ring structure with adjacent $R_1$ or $R_5$.

In the rubber composition, the compound represented by the general formula (1) is preferably a naturally occurring compound.

In the rubber composition, the compound represented by the general formula (1) is preferably at least one of 3,4-dihydroxycinnamic acid and 3,4-dimethoxycinnamic acid.

The present invention also relates to a pneumatic tire including a rubber part containing a vulcanized rubber of the rubber composition according to any one of the above aspects.

The rubber composition according to the present invention contains a predetermined amount of the compound represented by Formula (1), and therefore a vulcanized rubber of the rubber composition is excellent in heat aging resistance. Particularly, the use of a naturally occurring compound as the compound represented by Formula (1) is more preferred in terms of environmental protection, and the use of 3,4-dihydroxycinnamic acid or 3,4-dimethoxycinnamic as the compound represented by Formula (1) is particularly preferred in terms of both heat aging resistance and environmental protection. It is to be noted that 3,4-dihydroxycinnamic acid and 3,4-dimethoxycinnamic acid may be used in combination.

DETAILED DESCRIPTION OF THE PREFERRED EMBODIMENTS

A according to the present invention contains, per 100 parts by mass of a total amount of a rubber component, 0.1 to 10 parts by mass of a compound represented by the following general formula (1):

[Formula 2]

(1)

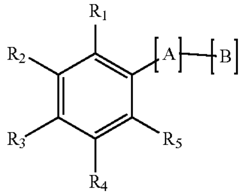

wherein at least one of $R_1$ to $R_5$ is an —OH group or an —$OCH_3$ group and others are each a —H group or a hydrocarbon group having 1 to 20 carbon atoms, A is an unsaturated bond or an alkylene group having 1 to 20 carbon atoms and optionally having an —H group, a —$CH_3$ group, an —$NH_2$ group, an —O— group, or an —OH group, n is an integer of 0 to 10, and B is a —COOH group, an —OH group, or an =O group and optionally forms a ring structure with adjacent $R_1$ or $R_5$.

The content of the compound represented by the general formula (1) is more preferably 0.5 to 5 parts by mass per 100 parts by mass of the total amount of the rubber component.

The use of a naturally occurring compound as the compound represented by the general formula (1) is more preferred in terms of environmental protection. Examples of the naturally occurring compound include compounds shown below.

[Formula 3]

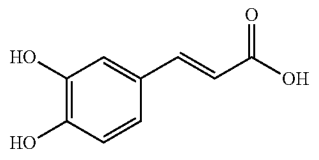

3,4-dihydroxycinnamic acid

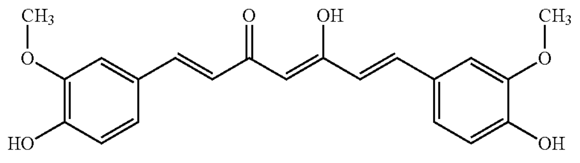

Curcumin

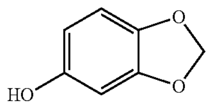

Sesamol

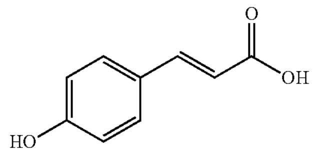

Coumaric acid

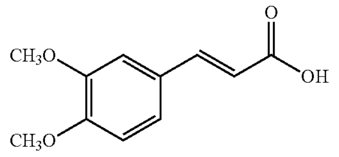

3,4-dimethoxycinnamic acid

In the present invention, among these compounds, at least one of 3,4-dihydroxycinnamic acid (caffeic acid) and 3,4-dimethoxycinnamic acid is more preferably used from the viewpoint of improving the heat aging resistance of a vulcanized rubber. The reason why the use of at least one of 3,4-dihydroxycinnamic acid and 3,4-dimethoxycinnamic acid as an antiaging agent improves the heat aging resistance of a vulcanized rubber is not known, but there may be, for example, the following reasons (1) to (3):

(1) when at least one of 3,4-dihydroxycinnamic acid and 3,4-dimethoxycinnamic acid and a zinc compound such as zinc oxide are added to the rubber composition used as a raw material, two or more molecules of 3,4-dihydroxycinnamic acid or 3,4-dimethoxycinnamic acid coordinate with zinc through hydroxy groups or methoxy groups at $R_2$ and $R_3$ positions in the rubber composition so that the molecular weight increases due to the formation of a complex;

(2) formation of a complex of two or more molecules of 3,4-dihydoxycinnamic acid or 3,4-dimethoxycinnamic acid allows 3,4-dihydroxycinnamic acid or 3,4-dimethoxycinnamic to remain in the rubber composition and the vulcanized rubber without blooming; and (3) prevention of blooming of 3,4-dihydroxycinnamic acid or 3,4-dimethoxycinnamic acid in the rubber composition or the vulcanized rubber allows 3,4-dihydroxycinnamic acid or 3,4-dimethoxycinnamic acid to effectively exhibit its antioxidative effect so that the heat aging resistance of the vulcanized rubber improves.

It is to be noted that a non-naturally occurring compound may be used as the compound represented by the general formula (1). Examples of the non-naturally occurring compound include compounds shown below.

[Formula 4]

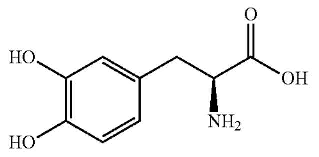

3-(3,4-dihydroxyphenyl)-L-alanine

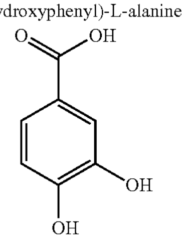

Protocatechuic acid

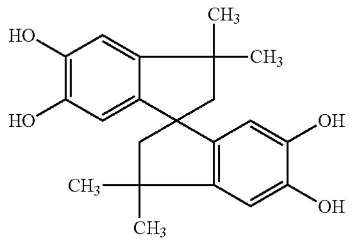

5,5′,6,6′-tetrahydroxy-3,3,3′3′-tetramethyl-1,1′-spirobiindane

As the rubber component, for example, a diene-based rubber can suitably be used. Examples of the diene-based rubber include, but are not limited to, natural rubber (NR), isoprene rubber (IR), butadiene rubber (BR), styrene-butadiene rubber (SBR), acrylonitrile-butadiene rubber (NBR), chloroprene rubber (CR), styrene-isoprene copolymer rubber, a butadiene-isoprene copolymer, and styrene-isoprene-butadiene copolymer rubber. These butadiene-based rubbers may be used alone or in combination of two or more thereof. The diene-based rubber is preferably natural rubber, isoprene rubber, butadiene rubber, styrene-butadiene rubber, or a blend of two or more thereof.

The rubber composition according to the present invention preferably contains carbon black as a filler. Examples of the carbon black that can be used include: carbon blacks usually used in the rubber industry, such as SAF, ISAF, HAF, FEF, and GPF; and conductive carbon blacks such as acetylene black and ketjen black.

Further, silica is preferably contained as a filler. Examples of the silica to be used include silicas usually used for rubber reinforcement, such as wet silica, dry silica, sol-gel silica, and surface-treated silica. Among them, wet silica is preferred.

When silica is contained as a filler, a silane coupling agent is also preferably contained. The silane coupling agent is not particularly limited as long as sulfur is contained in the molecule thereof, and various silane coupling agents to be added to rubber compositions together with silica may be used. Examples of such silane coupling agents include: sulfidesilanes such as bis(3-triethoxysilylpropyl) tetrasulfide (e.g., "Si69" manufactured by Degussa), bis(3-triethoxysilylpropyl)disulfide (e.g., "Si75" manufactured by Degussa), bis(2-triethoxysilylethyl)tetrasulfide, bis(4-triethoxysilylbutyl)disulfide, bis(3-trimethoxysilylpropyl)tetrasulfide, and bis(2-trimethoxysilylethyl)disulfide; mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane; and protected mercaptosilanes such as 3-octanoylthio-1-propyltriethoxysilane and 3-propionylthiopropyltrimethoxysilane.

As a vulcanizing agent, sulfur can suitably be used. The sulfur may be ordinary sulfur for rubber, and sulfur such as powdered sulfur, precipitated sulfur, insoluble sulfur, and highly dispersible sulfur can be used.

Examples of a vulcanization accelerator include vulcanization accelerators usually used for rubber vulcanization, such as a sulfenamide-based vulcanization accelerator, a thiuram-based vulcanization accelerator, a thiazole-based vulcanization accelerator, a thiourea-based vulcanization accelerator, a guanidine-based vulcanization accelerator, and a dithiocarbamate-based vulcanization accelerator, and these may be used alone or in appropriate combination thereof. However, in the present invention, a sulfenamide-based vulcanization accelerator is preferably used because of its excellent property of reinforcing a vulcanized rubber and its excellent peeling resistance between a rubber for coating and a steel cord.

The rubber composition according to the present invention may contain, in addition to the rubber component, the compound represented by Formula (1), the filler, the vulcanizing agent, and the vulcanization accelerator, an antiaging agent other than the compound represented by Formula (1), stearic acid, a softener such as wax or oil, a processing aid, etc.

The rubber composition according to the present invention contains, as an antiaging agent, the compound represented by Formula (1), but may use an antiaging agent other than the compound represented by Formula (1) in combination. Examples of the antiaging agent other than the compound represented by Formula (1) include antiaging agents usually used for rubber, such as an aromatic amine-based antiaging agent, an amine-ketone-based antiaging agent, a monophenol-based antiaging agent, a bisphenol-based antiaging agent, a polyphenol-based antiaging agent, a dithiocarbamic acid salt-based antiaging agent, and a thiourea-based antiaging agent, and these may be used alone or in appropriate combination thereof.

The rubber composition according to the present invention is obtained by kneading the rubber component, the compound represented by Formula (1), the filler, the vulcanizing agent, the vulcanization accelerator, the antiaging agent, stearic acid, the softener such as wax or oil, the processing aid, etc. with the use of a kneading machine usually used in the rubber industry, such as a Banbury mixer, a kneader, or a roll.

A method for blending the above components is not particularly limited, and any one of the following methods may be used: a method in which components to be blended other than vulcanization-type compounding agents such as a vulcanizing agent and a vulcanization accelerator are previously kneaded to prepare a master batch, the remaining component (s) is (are) added to the master batch, and the mixture is further kneaded, a method in which components are added in any order and kneaded, and a method in which all the components are added at the same time and kneaded.

EXAMPLES

Hereinbelow, the structure and the effect of the present invention will be described with reference to specific examples etc.

(Preparation of Rubber Compositions)

Rubber compositions of Examples 1 to 11 and Comparative Example 1 were prepared according to formulations shown in Table 1 and kneaded using a usual Banbury mixer. Compounding agents listed in Table 1 are shown below (in Table 1, the amount of each of the compounding agents added is expressed in parts by mass per 100 parts by mass of the rubber component).

a) Natural rubber (RSS #3)
b) Carbon black: product name "N339 SEAST KH", manufactured by TOKAI CARBON CO., LTD.
c) Stearic acid: product name "LUNAC S-20", manufactured by Kao Corporation
d) Zinc oxide: product name "Zinc White #1", manufactured by MITSUI MINING & SMELTING CO., LTD.
e) Compound represented by general formula (1) (naturally occurring compound)
  (i) 3,4-dihydroxycinnamic acid: product name "Caffeic Acid", manufactured by BLD Pharmatech Ltd.
  (ii) Curcumin: product name "Curcumin (Natural)", manufactured by Tokyo Chemical Industry Co., Ltd.
  (iii) Sesamol: product name "Sesamol, 98%", manufactured by Sigma-Aldrich Japan
  (iv) Coumaric acid: product name "trans-p-Coumaric Acid", manufactured by Tokyo Chemical Industry Co., Ltd.
  (v) 3,4-dimethoxycinnamic acid: product name "3,4-Dimethoxycinnamic Acid", manufactured by Tokyo Chemical Industry Co., Ltd.
f) Compound represented by general formula (1) (non-naturally occurring compound)
  (vi) 3-(3,4-dihydroxyphenyl)-L-alanine: product name "3-(3,4-Dihydroxyphenyl)-L-alanine", manufactured by Tokyo Chemical Industry Co., Ltd.
  (vii) Protocatechuic acid: product name "3,4-Dihydroxybenzoic Acid", manufactured by Tokyo Chemical Industry Co., Ltd.
  (viii) 5,5',6,6'-tetrahydroxy-3,3,3'3'-tetramethyl-1,1'-spirobiindane: product name "5,5',6,6'-Tetrahydroxy-3,3,3',3'-tetramethyl-1,1'spirobiin dane", manufactured by Tokyo Chemical Industry Co., Ltd.
g) Sulfur: product name "Powder Sulfur", manufactured by Tsurumi Chemical Industry Co., ltd.
h) Vulcanization accelerator: product name "Sanceler NS-G", manufactured by SANSHIN CHEMICAL INDUSTRY CO., LTD.

The rubber compositions of Examples 1 to 11 and Comparative Example 1 were heated and vulcanized at 160° C. for 10 minutes or 20 minutes using a predetermined mold, and the durability of the thus obtained sample rubbers was evaluated by the following method.

(Heat Aging Resistance of Vulcanized Rubbers)

In accordance with JIS K6253, the sample rubbers were aged by being left to stand in a Geer oven for a predetermine time, and their breaking elongation retention rates (percentages of retention of breaking elongation after aging relative to initial breaking elongation) were measured. In Table 1, the breaking elongation retention rate is expressed as an index number relative to the retention rate of Comparative Example 1 defined as 100. The larger index number means higher heat aging resistance. The results are shown in Table 1.

TABLE 1

| | | Comparative Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Natural rubber | | 100 | 100 | 100 | 100 | 100 | 100 | 100 | 100 | 100 | 100 | 100 | 100 |
| Carbon black | | 45 | 45 | 45 | 45 | 45 | 45 | 45 | 45 | 45 | 45 | 45 | 45 |
| Stearic acid | | 3 | 3 | 3 | 3 | 3 | 3 | 3 | 3 | 3 | 3 | 3 | 3 |
| Zinc oxide | | 3 | 3 | 3 | 3 | 3 | 3 | 3 | 3 | 3 | 3 | 3 | 3 |
| Compound represented by general formula (1) | 3,4-dihydroxycinnamic acid | | 0.6 | 1.2 | 2.4 | 3.6 | | | | | | | |
| | Curcumin | | | | | | 2.8 | | | | | | |
| | Sesamol | | | | | | | 2.1 | | | | | |
| | Coumaric acid | | | | | | | | 2.5 | | | | |
| | 3,4-dimethoxycinnamic acid | | | | | | | | | 1.4 | | | |
| | 3-(3,4-dihydroxyphenyl)-L-alanine | | | | | | | | | | 1.3 | | |
| | Protocatechuic acid | | | | | | | | | | | 1 | |
| | 5,5',6,6'-tetrahydroxy-3,3,3',3'-tetramethyl-1,1'-spirobiindane | | | | | | | | | | | | 2.3 |
| Sulfur | | 1.5 | 1.5 | 1.5 | 1.5 | 1.5 | 1.5 | 1.5 | 1.5 | 1.5 | 1.5 | 1.5 | 1.5 |
| Vulcanization accelerator | | 0.8 | 0.8 | 0.8 | 0.8 | 0.8 | 0.8 | 0.8 | 0.8 | 0.8 | 0.8 | 0.8 | 0.8 |
| (Heat aging resistance) Breaking elongation retention ratio of vulcanized rubber (%) | | 100 | 110 | 108 | 113 | 117 | 118 | 121 | 117 | 117 | 105 | 108 | 113 |

As can be seen from the results shown in Table 1, the vulcanized rubbers of the rubber compositions according to Examples 1 to 11 are superior in heat aging resistance to the vulcanized rubber of the rubber composition according to Comparative Example 1.

What is claimed is:

1. A pneumatic tire comprising a rubber part containing a vulcanized rubber of a rubber composition consisting of, per 100 parts by mass of a total amount of a rubber component, 0.1 to 10 parts by mass of a compound represented by the following general formula (1):

[Formula 1]

(1)

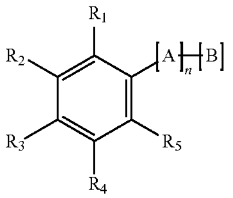

wherein at least one of $R_1$ to $R_5$ is an —OH group or an —$OCH_3$ group and others are each an —H group or a hydrocarbon group having 1 to 20 carbon atoms, A is an unsaturated bond or an alkylene group having 1 to 20 carbon atoms and optionally having an —H group, a —$CH_3$ group, an —$NH_2$ group, an —O— group, or an —OH group, n is an integer of 0 to 10, and B is a —COOH group, an —OH group, or an =O group and optionally forms a ring structure with adjacent $R_1$ or $R_5$, wherein the compound represented by the general formula (1) is at least one of 3,4-dihydroxycinnamic acid and 3,4-dimethoxycinnamic acid, and an amount of at least one of 3,4-dihydroxycinnamic acid and 3,4-dimethoxycinnamic acid is 1 to 10 phr, and optionally carbon black, silica, a vulcanizing agent, a vulcanizing accelerator, an antiaging agent other than the compound represented by Formula (1), stearic acid, a softener and a processing aid.

2. The pneumatic tire according to claim 1, wherein the compound represented by the general formula (1) is a naturally occurring compound.

3. The pneumatic tire according to claim 1, wherein the antiaging agent other than the compound represented by Formula (1) is selected from the group consisting of an aromatic amine-based antiaging agent, an amine-ketone-based antiaging agent, a monophenol-based antiaging agent, a bisphenol-based antiaging agent, a polyphenol-based antiaging agent, a dithiocarbamic acid salt-based antiaging agent, and a thiourea-based antiaging agent.

4. The pneumatic tire according to claim 1, wherein the vulcanizing agent is sulfur.

5. The pneumatic tire according to claim 1, wherein the vulcanizing accelerator is selected from the group consisting of a sulfenamide-based vulcanization accelerator, a thiuram-based vulcanization accelerator, a thiazole-based vulcanization accelerator, a thiourea-based vulcanization accelerator, a guanidine-based vulcanization accelerator, and a dithiocarbamate-based vulcanization accelerator.

* * * * *